United States Patent

[11] 3,540,591

| [72] | Inventor | Makoto Yamazaki<br>Tokyo, Japan |
|---|---|---|
| [21] | Appl. No. | 719,191 |
| [22] | Filed | April 5, 1968 |
| [45] | Patented | Nov. 17, 1970 |
| [73] | Assignee | Isuzu Kogyo Kabushiki Kaisha<br>Tokyo, Japan<br>a corporation of Japan |
| [32] | Priority | Dec. 8, 1967, Dec. 9, 1967 |
| [33] | | Japan |
| [31] | | Nos. 42/103250 and 42/103294 |

[54] FILTERING DEVICE FOR WATER TANKS, PARTICULARLY AQUARIUMS
8 Claims, 4 Drawing Figs.

[52] U.S. Cl. ............................................. 210/169,
210/196; 318
[51] Int. Cl. ..................................................... B01d 23/00
[50] Field of Search........................................... 210/169,
293, 283, 196, 314, 318, 335, 336

[56] References Cited
UNITED STATES PATENTS

| 1,465,968 | 8/1923 | Caps............................. | 210/293X |
| 2,665,250 | 1/1954 | Willinger et al. ............. | 210/169 |
| 2,783,893 | 3/1957 | Romanoff....................... | 210/169X |
| 2,889,275 | 6/1959 | Moore........................... | 210/169X |
| 3,152,987 | 10/1964 | Gare............................. | 210/169 |
| 2,359,985 | 10/1944 | Gordon.......................... | 210/336 |

Primary Examiner—John Adee
Attorney—Saul Grenside

ABSTRACT: An external filtering device for aquariums having a filtering tank casing, said casing incorporating a first filter zone and a second filter zone, said first and second filter zones being interconnected at the lower portion thereof so that water may flow from said first filter zone to said second filter zone.

INVENTOR.
Makato Yamazaki
BY Jecies and Greenside
his attorneys

FILTERING DEVICE FOR WATER TANKS, PARTICULARLY AQUARIUMS

BACKGROUND OF THE INVENTION

When fish are kept in a fixed amount of water, the water is gradually polluted by their excreta and decomposed feed, and this eventually leads to the formation of substances that render inhabitation impossible. As a rule, freshwater fish and saltwater fish of the aquarium type are extremely sensitive to the quality of water they inhabit, and accordingly, in polluted water, they almost invariably die as a result of lack of oxygen and generation of pathogenic bacteria. It is therefore important that the water be kept clean at all times. Accordingly, it is important that filtering devices of this type possesses features differing from those found in conventional filtering devices for industrial use.

It is widely known that foreign matter and other solid particles can be removed from water by means of a physical filtering process, that is, by passing the water through a filtering material so that the particles contained in the water are caught in the filtering material. It is also known that clear water can be obtained by pouring a suspension into a container, allowing the particles to settle, and subsequently removing the clear supernatant portion. While the physical filtering process and the decantation method may well rid water of solid particles, essentially they do not purify water, the reason being that they lack the chemical action required for changing the composition of water or for removing harmful substances from water.

When fish are kept in aquariums, the excreta of the fish invariably mix with the water. Such excreta consist of organic and inorganic substances and, if left alone, are of course harmful to the fish. It is therefore important that the organic substances be converted into inorganic substances such as ammonia and carbon dioxide and that they, together with the other inorganic substances, be decomposed and oxidized. In this connection, then, it is an important feature that filtering devices for aquariums be differentiated from industrial filtering devices.

A vital requirement for breeding fish in a fixed amount of water is that the water is provided with biochemical purifying action. Needless to say, biochemical purifying action is a natural phenomenon widely observed in rivers and lakes as well as the sea, a biochemical process provided by micro-organisms living in sand. When filtering sand is placed in water, the growth of micro-organisms that thrive on the excreta of fish may be observed in the sand within one or two months. Referred to as nitrifying bacteria, which consist of nitrococci and nitrate forming bacteria, these micro-organisms are capable of oxidizing organic and inorganic substances in water. More specifically, the nitrococci oxidized the ammonia contained in water into nitrous acid, and the nitrate forming bacteria, in turn, oxidized the nitrous acid into nitric acid.

Accordingly, it will be appreciated that, for maximum results, filtering devices for aquariums should combine physical filtering action and biochemical purifying action. While physical filtration of water can easily be affected, simultaneous biochemical purifying action is another matter, primarily because nitrifying bacteria are required for that purpose, and also because it is important that duration of contact between water and nitrifying bacteria is taken into account. In order to form nitrifying bacteria in the filtering material, it is important that the material is maintained in a natural condition observed in rivers, lakes and the sea. In other words, it is important that a certain period is allowed to lapse, and that the filtering material not be allowed to clog during that period. Also, the duration of contact between the water and nitrifying bacteria is made as long as possible, in order to facilitate the biochemical purifying action.

Filtering devices for aquariums may, by the position of the filtering material, be classified into two types: internal bottom filtration and external top filtration. In the former type, the filtering material is disposed within and at the bottom of the aquarium, and the water is made to flow through the filtering material. While filtering devices of this type, being simple in structure, are used on a substantial scale, they present such problems as premature clogging of the filtering material, difficulty in producing nitrifying bacteria and considerable trouble in cleaning the filtering material. Such drawbacks are not found in filtering devices of the latter type since they are provided with separate filtering tanks. But as the area of filtration is small despite the fact that the device is complex in structure, water tends to flow through the filtering material at a fast pace, thus retarding biochemical purifying action. Also, the installation of the filtering tank poses problems in terms of location. It may be pointed out that filtering tanks that allow of easy attachment to water tanks of all sizes have so far been unavailable. At any rate, it may be said that filtering devices for aquariums of the type disclosed in this invention have thus far been unknown.

SUMMARY OF THE INVENTION

It is an object of this invention to provide a filtering device for aquariums capable not only of removing solid particles from a fixed amount of water in a filtering tank as it passes through the filtering tank, but of exposing the water to the biochemical purifying action of nitrifying bacteria.

A further object of this invention is to provide a filtering device for aquariums simple in structure and allowing of easy disassembly and removal of parts, assembly without tools, attachment to water tanks of all sizes, and speedy cleaning and replacement of filtering material.

In this invention, the filtering device is provided with a filtering tank adapted to filter the water in the water tank in reflux. The filtering tank is provided therein with a first filtering zone and a second filtering zone which communicate with each other at the bottom portion only and form no outlet for the water over a portion extending from the bottom to a specific height. Accordingly, they are capable of retaining a specific volume of water. In the first filtering zone, the water is slowly guided from top to bottom, and during this process the solid particles contained in the water are separated by filtering material and harmful substances react biochemically to the nitrifying bacteria produced in the filtering material. In the second filtering zone, the water filtered in the first filtering zone is again subjected to physical filtering action and biochemical purifying action. As the water moves upward through the filtering material, the remaining solid particles and harmful substances are completely removed by the filtering material. Water filtered in the second filtering zone is discharged just as supernatant portions of liquids are poured off by decantation.

In other words, in the first filtering zone the greater part of the solid particles contained in the water are removed, and in the second filtering zone the remaining particles are eliminated and, further, biochemical reaction takes place under more favorable conditions. Biochemical purifying action is possible with regard to the water because both the first and second filtering zones are adapted to retain a fixed volume of water. The second filtering zone, in particular, makes it possible to effect decomposition of the harmful substances contained in the water without any danger of killing the nitrifying bacteria produced in the filtering material or of producing other obstacles, as a result of insufficient elimination of solid particles.

The first filtering zone is provided with a water pump designed to pump water contained in the water tank into the filtering tank. Also, according to the present invention, it is possible to make a filtering device in which the water pump may be removed with ease without shifting or removing part of the filtering material disposed in the filtering tank.

Viewed from above, the casing of the filtering tank generally forms a right-angled triangle, a short fitting board protruding downwardly from the two sides bounding the right angle. Accordingly, the filtering tank may easily be mounted on water tanks of all sizes by aligning its square portion with the corresponding portion of the water tank and fitting board around the rim of the water tank.

Water discharged from the filtering device is either allowed to fall directly into the water tank or sent back to the water tank by way of a water pipe. In the latter case, it is an important feature that in order to supply the water in the water tank with oxygen, part of the water filtered in the first filtering zone is allowed to fall into the water tank from the bottom of the first zone before the water is guided into the second filtering tank. The outlet for this purpose is also useful for emptying the filtering tank after use.

The main features of the present invention may be summarized as follows:

1. An external filtering device for aquariums adapted to filter water therein by reflux and having a filtering tank casing, said casing incorporating a first filter zone and a second filter zone, said first and second filter zones being interconnected at the lower portion thereof so that water may flow from said first filter zone to said second filter zone, said second filter zone containing therein a water discharge outlet opening at a specific level from the bottom of said filtering tank casing.

2. A filtering device according to the paragraph 1 wherein said filtering tank casing is provided with a perforated board having leg elements so as to permit spaced installation of said board in relation to the bottom of said casing, and wherein said filtering tank casing has a partition disposed perpendicularly and slightly above said perforated board so as to form a first filter zone and a second filter zone interconnecting only at the lower portion thereof.

3. A filtering device according to the paragraph 2 wherein said filtering tank casing is provided with a water outlet for supplying oxygen, said outlet being disposed below said perforated board and completely penetrating the bottom of said casing.

4. A filtering device according to the paragraph 2 wherein an overflow tube pipe opens at a level at least higher than the normal water discharge outlet in the second filter zone.

5. A filtering device according to the paragraph 2 wherein said filtering tank casing generally forms a right-angled triangle when viewed from above, and wherein a short fitting board protrudes downwardly from the two sides extending from the right-angled portion of said casing in order that said casing may be mounted on a water tank.

6. A filtering device according to the paragraph 1 wherein said filtering tank casing is provided with a perforated board having leg elements so as to permit spaced installation of said board in relation to the bottom of said casing, said filtering tank casing having a partition disposed perpendicularly and slightly above said perforated board so as to form a first filter zone and a second filter zone interconnecting only at the lower portion thereof, and a retaining tube extending upwardly through and from the bottom thereof, said retaining tube supporting therein a water pipe so disposed that its suction inlet is positioned below said filtering tank casing and its discharge outlet is positioned in the upper part of said first filter zone.

7. A filtering device according to the paragraph 6 wherein a water outlet for supplying oxygen is disposed below said perforated board so as to penetrate the bottom of said filtering tank casing.

8. A filtering device according to the paragraph 6 wherein an overflow tube opens at a level at least higher then the normal water discharge outlet in the second filter zone.

9. A filtering device according to the paragraph 6 wherein said filtering tank casing generally forms a right-angled triangle when viewed from above, and wherein a short fitting board protrudes downwardly from the two sides extending from the right-angled portion of said casing in order that said casing may be mounted on a water tank.

DESCRIPTION OF THE PREFERRED EMBODIMENTS

Figure 1:
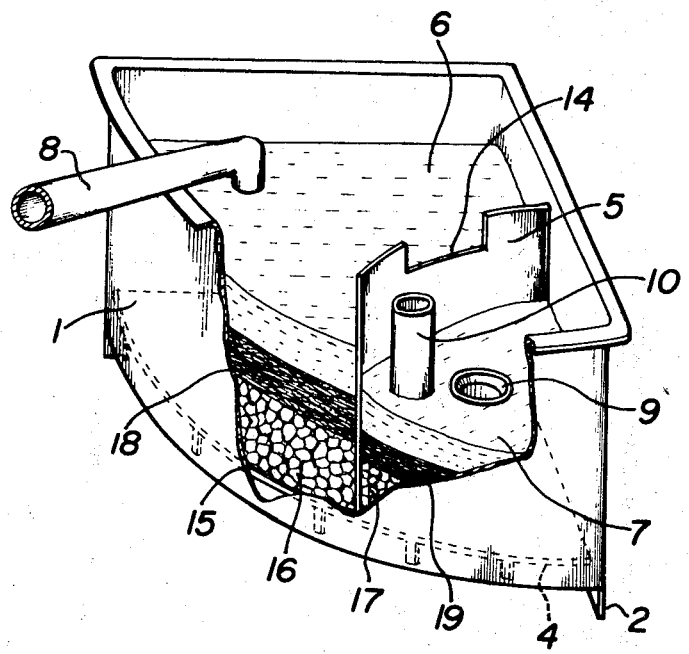
FIG. 1 is a diagonal cutway view of a filtering device constructed according to an embodiment of this invention.
Figure 2:
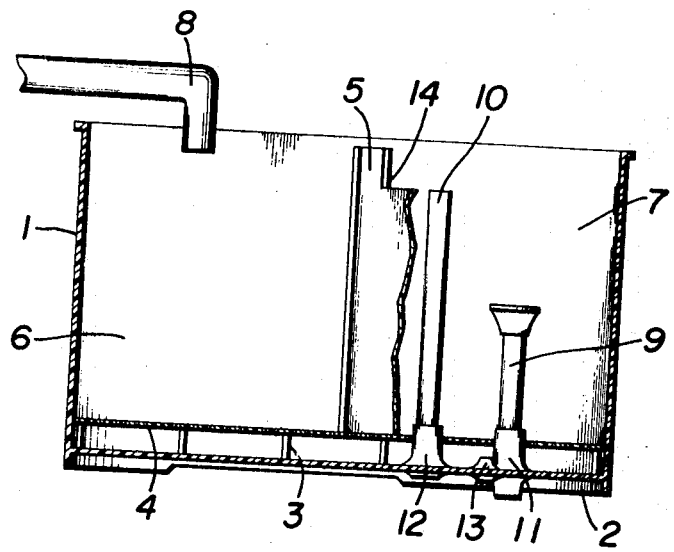
FIG. 2 is a sectional view of the filtering device shown without filtering material.

With regard to the filtering device shown in FIGS. 1 and 2, the filtering tank casing generally forms a right-angled triangle when viewed from above, and may be mounted on water tanks of all sizes by aligning the square corner thereof with the corresponding corner of the water tank. A short fitting board 2 adapted to be fitted around the rim of the water tank protrudes downwardly from the two sides bounding the square corner of the bottom of the casing. This not only solves the problem of installation but provides an attractive appearance. If desired, a fitting board adapted to fit onto the rim of the water tank may be provided at the bottom of the filtering tank casing 1.

A perforated plate or insert 4 is disposed within the filtering tank casing 1 and is maintained at a suitable distance from the bottom wall of the casing by means of leg elements 3. The filtering tank is divided into a first filtering zone or chamber 6 and a second filtering zone or chamber 7 by means of a partition 5 extending vertically from the perforated plate 4, the filtering zones 6, 7 communicating with each other under the perforated plate 4. More specifically, the perforated plate 4 is disposed so as to cover the bottom portion of the filtering tank casing 1, and the partition 5 is supported between the side walls of the casing. Practically, the partition 5 should preferably be composed of a flexible material and inserted in a slightly curved state between the side walls of the filtering tank casing 1. Also, if possible, the filtering tank casing 1 should be provided with grooves of other restraining means in order to prevent the partition from shifting or moving out of place. The pressure produced by the lateral expansion of the partition would then hold the partition and the side walls of the filtering tank casing firmly together and, moreover, it would be possible to remove the partition without difficulty.

In this invention, the water to be filtered is guided into the first filtering zone 6 by way of water induction pipe 8 extending into the upper portion thereof. The water induction pipe connects with the discharge outlet of a water pump (not shown) whose suction inlet extends into the water tank, and is therefore able to guide water in the water tank into the first filtering zone 6. Any conventional water pump may be used for this purpose, and there is no restriction regarding the location of the pump.

The second filtering zone 7 is provided with an ordinary discharge pipe 9 and an overflow pipe 10, the former being lower than the latter. These pipes are removably inserted in connection openings 11, 12 formed in the bottom of the filtering tank casing 1, and extend upwardly through the perforated plate 4. Needless to say, these pipes are open at both ends and are adapted to take in water from the top and discharge it from the bottom. A small hole 13 adapted to let water fall directly into the water tank in order to supply water in the water tank with oxygen is formed adjacent the connection opening 12 for the overflow pipe. Obviously, no water would remain in the filtering tank casing 1 if the volume discharged from the oxygenation hole 13 were equal to the volume of incoming water. However, if the volume of incoming water is increased, on the one hand a specific amount of water would remain in the first filtering zone 6 and the second filtering zone 7, and on the other hand a certain amount would be discharged by way of the discharge tube 9. It follows, then, that a further increase in the volume of incoming water would result in the discharge of water from both the discharge tube 9 and the overflow tube 10. Accordingly, according to the present invention, the level of the water remaining in the first filtering zone 6 and the second filtering zone 7 may constantly be maintained flush with the upper end of the discharge tube 9 by regulating the volume of incoming water so that it matches the volume of water discharged from the oxygenation hole 13 and the discharge pipe 9. Surplus water accumulating either as a result of oversupply of water or as a result of clogging of the discharge pipe 9 or the oxygenation hole 13 is discharged by way of the overflow pipe 10.

An indent 14 is formed in the upper portion of the partition 5 in order to provide an emergency passage for water when water fed into the first filtering zone 6 fails to reach the second filtering zone 7.

Both the first filtering zone 6 and second filtering zone 7 must be provided with filtering material. For example, as shown in FIG. 1, a common filter cloth 15 is first spread over the first filtering zone 6 and the second filtering zone 7. The second filter layer consists of rough beach sand 16 in the case of the first filtering zone and of coral sand or crushed shells 17 in the case of the second filtering zone. The top layer consists of resin fiber or glass fiber 18, 19 in both cases. For the second filtering zone, it is an important feature that the top filter layer 19 be disposed lower than the opening of the discharge pipe 9 in order to avoid closing the pipe. The filtering material divides each zone or chamber into an upper and a lower section, as illustrated.

Figure 3:
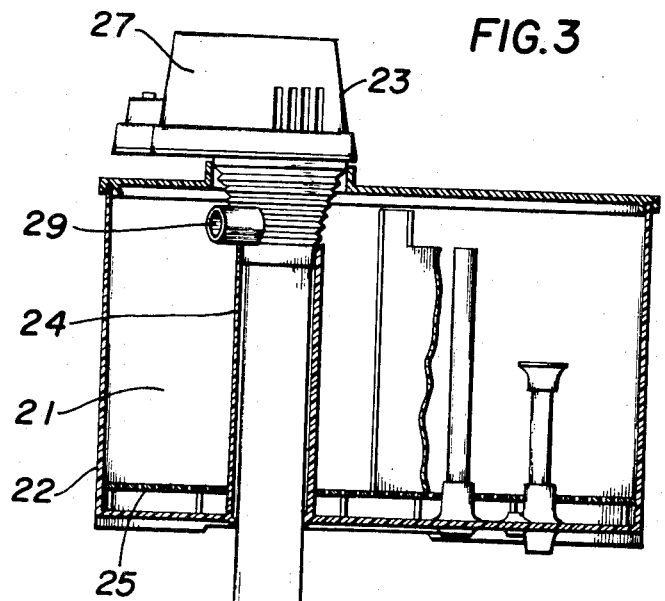
FIG. 3 is a sectional view of a filtering device constructed according to another preferred embodiment of the present invention.

The filtering device shown in FIG. 3 is substantially the same in structure as that described above, except that a water pump 23 for induction of the water to be filtered may be installed in filtering tank casing 22. Part of the water pump 23 is inserted in a tubular retaining means 24 disposed vertically in the first filtering zone 21 in order to prevent it from shifting or toppling. The tubular retaining means 24 is fixed to the bottom of the filtering tank casing 22 and extends upwardly through the perforated plate 25. While the water pump 23, which extends to a certain height in the first filtering zone 21, may be of the conventional type, it should preferably be a vertical axial-flow pump with a very small capacity since this type of pump generally has an intermediate drum extending downwardly from the electric motor, thereby making it possible to dispose the suction inlet and the discharge outlet at the ends of the intermediate drum. Another advantage is that a pump having an intermediate drum of the desired length may be obtained. In other words, as shown in FIG. 3, this type of pump is highly convenient not only for inserting the intermediate drum 26 in the tubular retaining means 24 and for mounting the electric motor 27 thereon, but in that the intermediate drum may readily be made to extend into the water tank and, further, in that the suction inlet 28 and the discharge outlet 29 may be disposed respectively at the lower end and the upper portion of the intermediate drum. The discharge outlet 29 is suspended over the upper rim of the tubular retaining means 24 means of a suspending element provided on the outlet and is oriented toward the first filtering zone 21.

Figure 4:
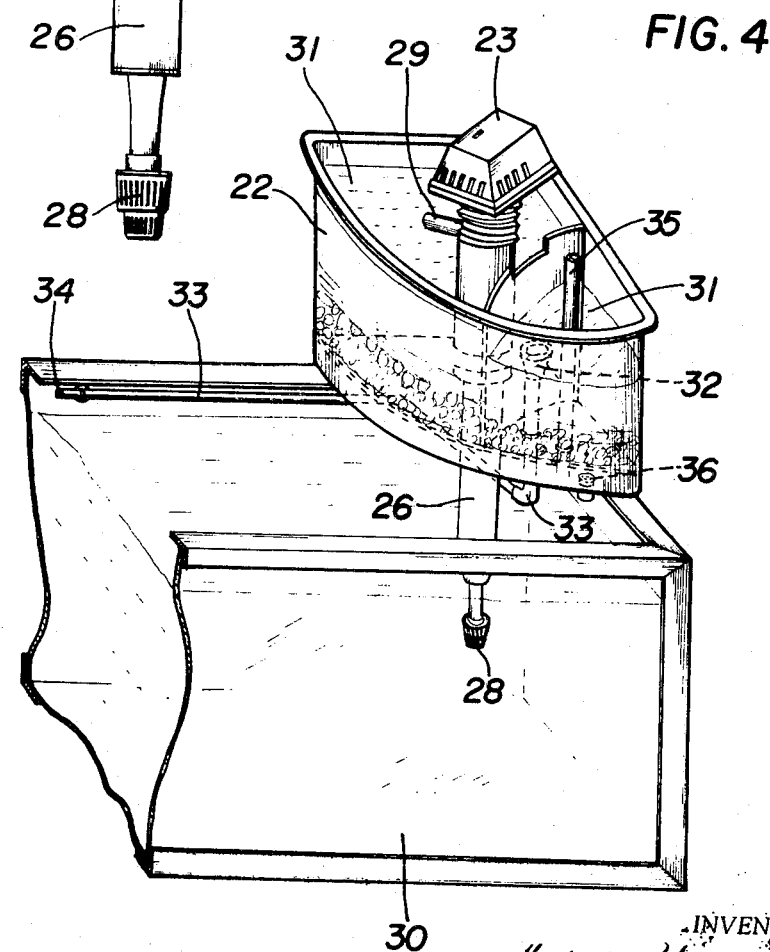
FIG. 4 is a diagonal view of the filtering device mounted on a water tank.

While FIG. 4 refers specifically to the application of the filtering devices shown in FIG. 3, filtering device that do not incorporate water pumps may also be used in the same manner if they are provided with a substitute device.

The filtering device may be installed without difficulty by aligning the filtering tank casing 22 with the corner of the water tanks 30. In this case, the intermediate drum 26 of the water pump 23 is positioned in the lower portion of the water tank 30. Accordingly, when operation is commenced in this state, water in the water tank 30 is sucked into the intermediate drum 26 by way of the suction inlet 28 and is guided toward the discharge outlet 29. After passing through the first filtering zones 21, the water reaches the second filtering zone 31 and travels on to the water outlet 32. If the lower part of the water outlet 32 is open, the water, of course, flows back to the water tank 30. While this method may be employed, for more effective purification of the water in the water tank 30 it is preferable that a water distribution pipe 33 be connected with the water outlet 32 and that the outlet 34 of the water distribution pipe be disposed at a substantial distance from the filtering device. This method facilitates extensive purification of the water in the water tank. Both the overflow pipe 35 and the oxygenation hole 36 open at the bottom of the filtering tank casing 22 toward the water tank 30. A small amount of water constantly falls into the water tank 30 by way of the oxygenation hole. A salient feature of this filtering device is that the filtering material may be cleaned or replaced without touching the water in the water tank.

I claim:

1. A filtering device, particularly for use in filtering aquarium water, comprising:

casing means defining an initial and a terminal chamber and having a bottom wall;

filter means arranged in and subdividing each of the respective chambers into an upper and lower section;

passage means interconnecting said lower sections in the region of said bottom wall, said lower sections together defining a reservoir;

inlet means communicating with said upper section of said initial chamber for admitting the liquid to be filtered, said inlet means including conduit means extending upwardly through said bottom wall and having an intake opening located below said bottom wall and a discharge opening located in said upper section of said initial chamber; and outlet means communicating with said upper section of said terminal chamber at a predetermined level above said filter means therein, liquid admitted by said initial means passing through said filter means in said initial chamber and dwelling in said reservoir constituted by said lower sections for a time sufficient to undergo tempering in said reservoir prior to upward passage through said filter means in said terminal chamber and evacuation through said outlet means.

2. A filtering device as defined in claim 1, wherein said casing generally forms a right-angled triangle when viewed from above, and wherein a fitting protrudes downwardly from the two sides extending from the right-angled portion of said casing wherewith said casing may be mounted on a water tank.

3. A filtering device as defined in claim 1, further comprising a foraminous insert located intermediate said filter means and said bottom wall, upwardly spaced from and supported by the latter; and wherein said casing means comprises a partition wall extending upwardly from said insert and subdividing the interior of said casing means into said chambers.

4. A filtering device as defined in claim 3, wherein said filter means is supported on said insert.

5. A filtering device as defined in claim 3, and further comprising a least one oxygenating aperture in said bottom wall communicating with one of said chambers for permitting the escape of some of the water therefrom.

6. A filtering device as defined in claim 5, wherein said aperture communicates with said lower section of said terminal chamber.

7. A filtering device as defined in claim 1, and further comprising an overflow opening communicating with said upper section of said terminal chamber at another level above said predetermined level.

8. A filtering device as defined in claim 1, and further comprising means for aspirating liquid through said intake opening into said inlet pipe, and for expelling the aspirated liquid through said discharge opening.